United States Patent [19]

Sheldon, Jr. et al.

[11] Patent Number: 5,722,224
[45] Date of Patent: Mar. 3, 1998

[54] MOISTENER SYSTEM FOR A COTTON HARVESTER

[75] Inventors: Donald Henry Sheldon, Jr., Johnston; Jeffrey Scott Wigdahl, Ames; Timothy Arthur Deutsch, Newton, all of Iowa

[73] Assignee: Deere & Company, Moline, Ill.

[21] Appl. No.: 637,065

[22] Filed: Apr. 24, 1996

[51] Int. Cl.$^6$ .................................................. A01D 46/18
[52] U.S. Cl. ........................................ 56/41; 56/50; 56/12.1
[58] Field of Search ................................. 56/28, 32, 40, 56/41, 50, 13.3, 10.2 H, 10.2 R, DIG. 11, 30, 33, 34, 35, 43, 47, 12.1

[56] References Cited

U.S. PATENT DOCUMENTS

| 4,461,140 | 7/1984 | Carmi et al. ............... 56/41 X |
| 4,850,184 | 7/1989 | Deutsch et al. ............... 56/41 |
| 4,905,464 | 3/1990 | Thedford ............... 56/41 X |
| 5,355,663 | 10/1994 | Deutsch et al. ............... 56/41 X |
| 5,490,373 | 2/1996 | Davenport et al. ............... 56/41 |
| 5,499,491 | 3/1996 | Deutsch et al. ............... 56/11.9 X |

OTHER PUBLICATIONS

Deere & Co., Parts Catalog for the "9940 Cotton Picker" PC-1800, pp. 130-10 and 130-11, dated 16 Nov. 1983, published in the U.S.A.

Deere & Co., Parts Catalog for the "9965 Cotton Picker" PC-2366, 3 pages, dated 5 Oct. 1994, published in the U.S.A.

Primary Examiner—Terry Lee Melius
Assistant Examiner—Robert Pezzuto

[57] ABSTRACT

A fluid distributor system for the moistener column of a cotton harvester includes a distributor connected to the top of the column and having a generally cone-shaped surface with a solid apex area and with distributor outlets uniformly spaced around the base area of the cone. A removable clear plastic cover snap-fits on the distributor and has an apex area with an easily detachable bayonet mounting for a spray nozzle that directs spindle cleaning fluid to the cone-shaped surface. A flush line inlet is located in the cover above the apex area and directs fluid around the nozzle and downwardly towards the distributor outlets in a uniform pattern for good flushing of all the lines connected to the outlets. O-rings between the cover and the distributor, and between the spray nozzle mounting and the cover, seal the unit against dirt and debris and facilitate snap fit assembly of the components. A shield, held in position by the cover, defines with the cover a generally continuous smooth, dirt-shedding structure to prevent accumulation of foreign matter near the distributor. A lip on the cover keeps any dirt out of the distributor as the cover is being removed.

23 Claims, 5 Drawing Sheets

5,722,224

1

MOISTENER SYSTEM FOR A COTTON HARVESTER

BACKGROUND OF THE INVENTION

1. Field of the Invention

The present invention relates generally to cotton harvesters and, more specifically, to a moistener system for the row unit of a cotton picker.

2. Related Art

Cotton harvester row units include upright picker drums with rows of spindles that project into the cotton plants. After the spindles remove cotton from the plants and the cotton is doffed, the spindles pass under pads of an upright moistener column which clean plant juices and other debris from the surface of the spindles. The moistener column includes an upright frame carrying a plurality of pad support arms which project laterally toward the spindles. Each pad support arm carries a flexible moistener pad having fins which contact and wipe the passing spindles. A fluid supply system includes a distributor supported on top of the column with tubes connected to outlets on the distributor and extending downwardly through the column to each of the moistener pads.

Existing distributor systems are often difficult to access and are subject to contamination. Pivoting moistener columns such as shown in U.S. Pat. No. 5,471,826 are now available wherein a fluid distributor system is located outside of the row unit and is movable with the column to an easily accessible position for servicing. However, the distributor cover which supports a distribution nozzle is attached to the distributor with wire bails or screws, and cover removal and nozzle servicing can be difficult. Further, the distributor structure accumulates dirt and debris which can fall into the distributor when the cover is removed during servicing. Lack of sealing in the structure also leads to system contamination.

Most fluid systems include flushing structure which cleans the distributor and tubes at regular intervals during harvesting. One continuing problem with most presently available systems is lack of uniform distribution of the flow to the numerous lines connected to the distributor outlets. Many of the distributors have a cone-shaped configuration with the outlets located at the base around the outer circumference of the cone. A flush line outlet is located at the apex of the cone, and fluid is directed to the flush line outlet through a line coming into the bottom of the distributor.

BRIEF SUMMARY OF THE INVENTION

It is therefore an object of the present invention to provide improved distributor structure for a cotton harvester moistener column. It is a further object to provide such an improved structure which eliminates most or all of the aforementioned problems.

It is a another object of the present invention to provide an improved moistener column distributor structure which is simple in construction, easy to assemble and disassemble and easy to inspect and service. It is a further object to provide such a structure which eliminates wire bails and does not require separate assembly hardware.

It is a further object of the invention to provide improved distributor structure for a cotton harvester moistener column which is substantially sealed during operation for improved flow rate and good pressure system distribution.

It is still another object of the present invention to provide an improved moistener column distributor structure which

2 prevents dirt and debris from contaminating the distributor and clogging the fluid paths to the moistener pad fins. It is another object to provide such a structure which helps shed dirt and debris from the distributor area and which includes cover structure which prevents contamination during disassembly of the unit. It is a further object to provide such a structure which includes an additional protective shield which is held in position by the cover structure and defines therewith a smooth dirt-shedding continuous surface to prevent build up of dirt and debris around the distributor.

It is yet a further object of the present invention to provide improved distributor structure for a cotton harvester moistener column having fluid distribution characteristics which are significantly improved over most previously available distributor structures. It is another object to provide such a distributor structure having an improved flush inlet arrangement and better flush fluid distribution characteristics than at least most previously available distributor structures.

A fluid distributor system for the moistener column of a cotton harvester includes a distributor connected to the top of the column frame and having a generally cone-shaped surface with a solid apex area for improved fluid distribution to distributor outlets uniformly spaced around the base area of the cone. A removable clear plastic cover snap-fits on the distributor and has an apex area with an easily detachable bayonet mounting for a spray nozzle that directs spindle cleaning fluid to the cone-shaped surface. A top flush orifice includes an inlet located in the cover closely adjacent the nozzle. Flush fluid is directed down around the lower end of the nozzle uniformly towards the distributor outlets for good flushing of all the outlets and tubes connected to the outlets. O-rings between the cover and the distributor and between the spray nozzle mounting and the cover seal the unit against dirt and debris and facilitate snap fit assembly of the components. The sealing arrangement also provides a higher fluid flow rate and maintains good pressure system distribution.

A shield held by the cover defines with the cover a generally continuous smooth, dirt-shedding structure to prevent accumulation of foreign matter near the distributor. A lip on the cover keeps any dirt out of the distributor as the cover is being removed and maintains a protective shield in place. The cover also positively locks the distributor to the upper end of the column frame. The entire distributor system fits together and is secured to the frame without need for additional fasteners, bails or other hardware and can be assembled and disassembled without tools.

These and other objects, features and advantages of the present invention will become apparent to one skilled in the art upon reading the following detailed description in view of the drawings.

DETAILED DESCRIPTION OF THE DRAWINGS

Figure 1:
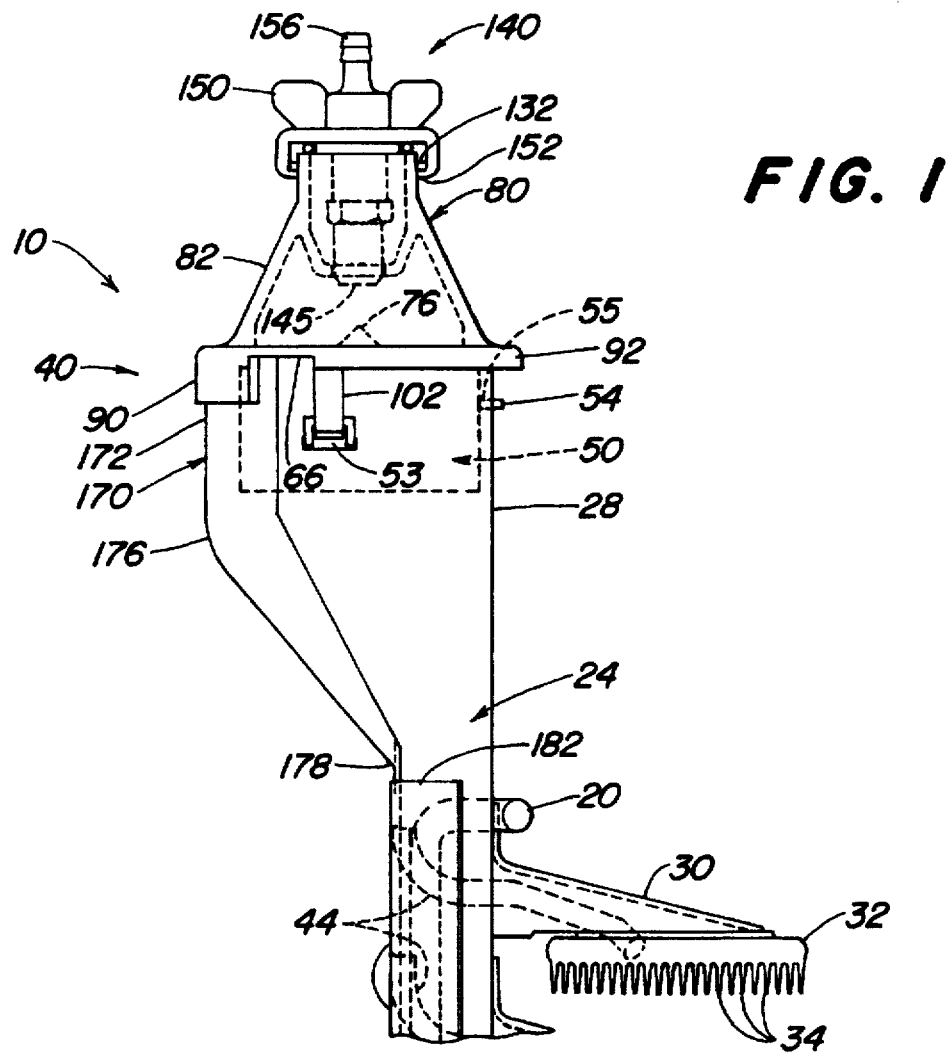
FIG. 1 is a view of a moistener column with a fluid distribution system.
Figure 1:
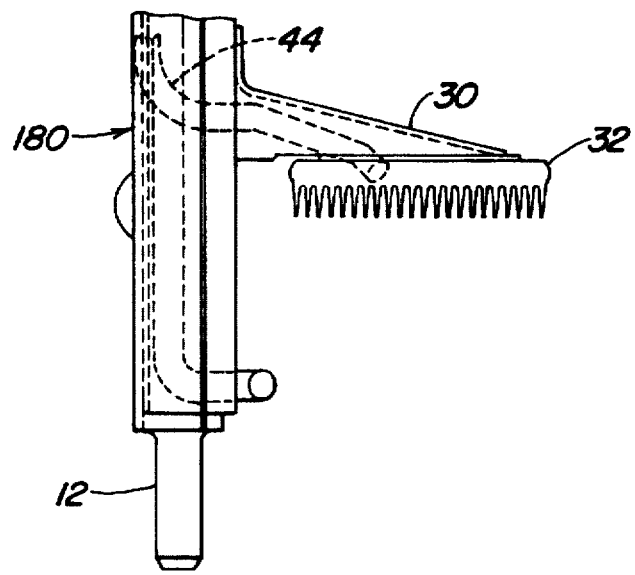
Figure 2:
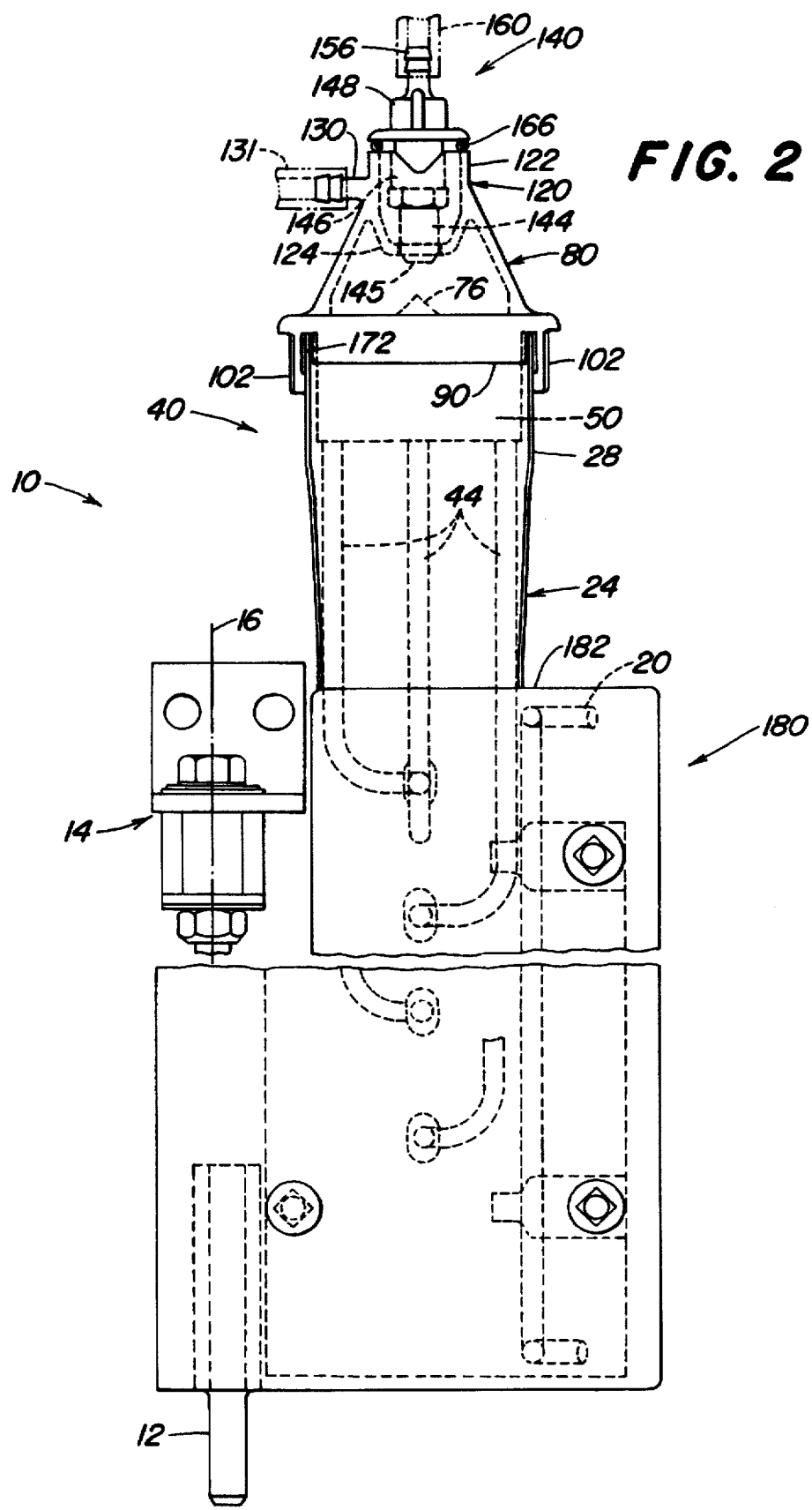
FIG. 2 is an enlarged side view showing the upper and lower portions of the column of FIG. 1.
Figure 3:
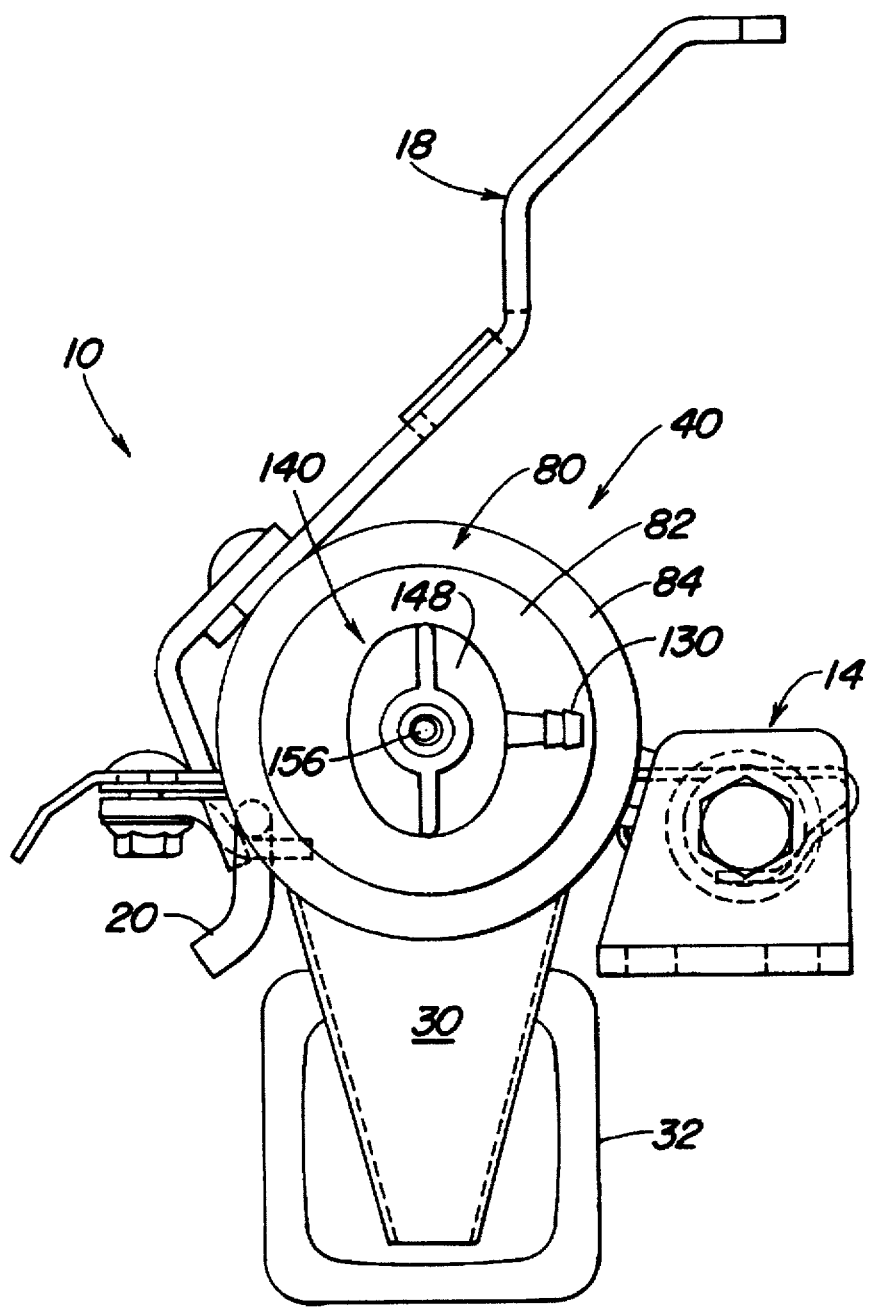
FIG. 3 is a top view of the column of FIGS. 1 and 2.

Referring now to FIGS. 1-3, therein is shown a moistener column assembly 10 which is pivotally connected to the row unit housing (not shown) of a cotton picker by a lower pivot 12 (FIGS. 1 and 2) and upper vertically adjustable pivot 14 (FIGS. 2 and 3) for rocking about an upright axis 16 between a field-working position and an access position wherein the column assembly 10 is located outwardly of the housing. A handle and latch assembly 18 (FIG. 3) and torsion bar arrangement 20 releasibly secure the column assembly in the field-working position.

The column assembly 10 includes an outwardly opening channel-shaped support frame 24 (FIGS. 1 and 2) connected to the pivots 12 and 14 and having an enlarged distributor-receiving upper end 28. Moistener pad holders 30 are fixed to the face of the support frame 24 at uniformly spaced intervals, and moistener pads 32 are supported by the holders 30 directly above corresponding rows of cotton picking spindles (not shown). The pads 32 include rows of flexible fins 34 projecting downwardly to wipe doffed spindles. The upper end 28 of the frame 24 supports a fluid distribution system 40 which directs fluid into fluid tubes 44 routed through the frame 24 to the individual pad holders 30. The fluid passes from the ends of the tubes 44 through apertures at the base of the pads 32 and onto the fins 34 to help clean the doffed spindles prior to reentry of the spindles into the row of cotton plants.

Figure 4:
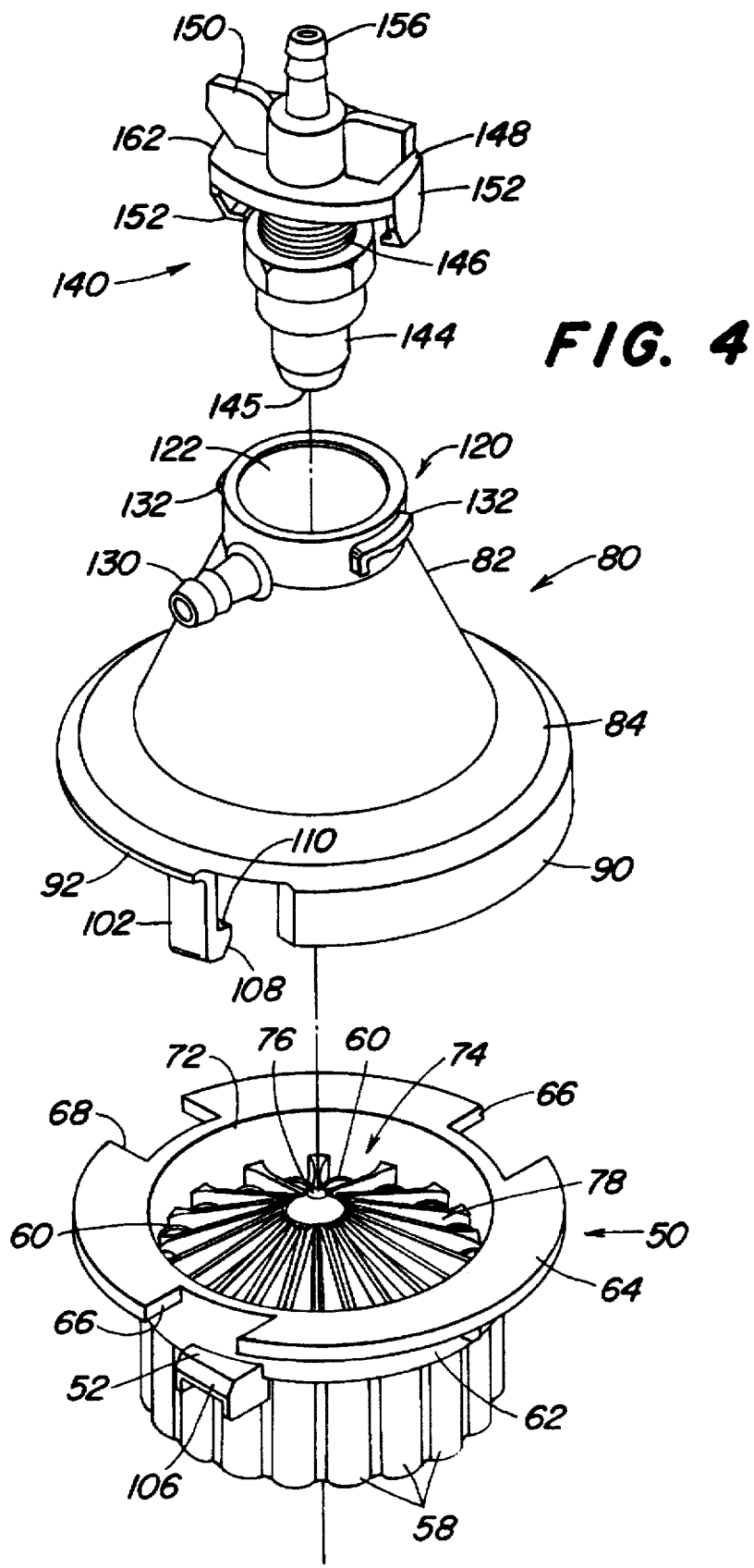
FIG. 4 is an exploded view of the distributor, cover and nozzle structure of the fluid distribution system.
Figure 5:
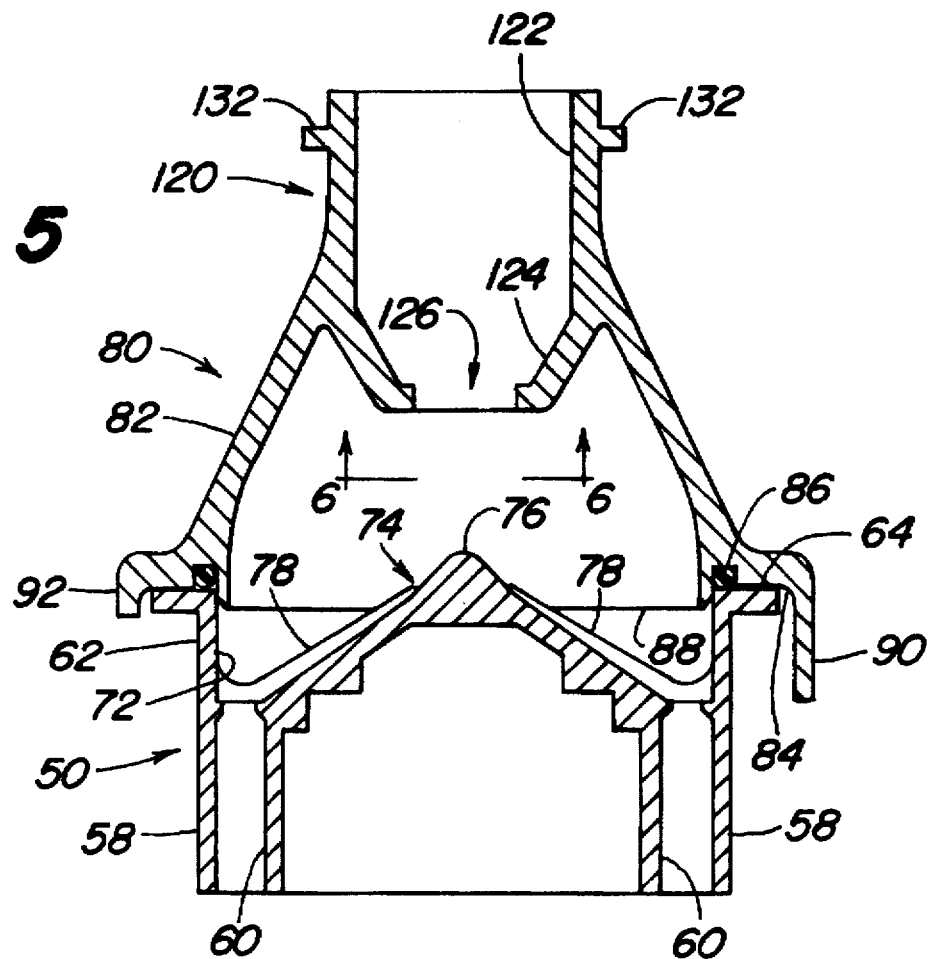
FIG. 5 is a cross sectional view of the distributor and cover of FIG. 4.
Figure 6:
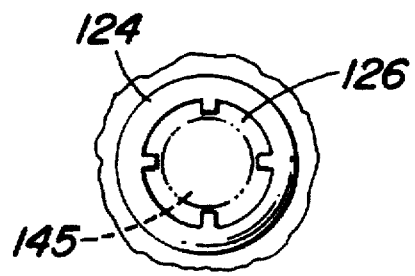
FIG. 6 is a view taken generally along lines 6—6 of FIG. 5.

The distribution system 40 includes a distributor 50 having a generally circular configuration with a pair side tabs 52 extending outwardly on opposite sides of the distributor and adapted for providing a snap fit into corresponding apertures 53 in the sides of the upper end 28 of the frame 24 (FIG. 1). The distributor 50 also includes a rear tab 54 which projects through a rear aperture 55 in the end 28. Cylindrically shaped tube-receiving sockets 58 (FIGS. 4 and 5) are uniformly spaced around the periphery of the distributor 50 and include cylindrical bores 60 which receive and support the upper ends of the tubes 44. A cylindrically shaped portion 62 extends upwardly from the sockets 58 and terminates in a circular flange 64 having notches 66 and 68 located above the side tabs 52 and rear tab 54, respectively. The inside of the portion 62 incudes a cylindrically shaped cover-receiving portion 72 extending downwardly to the inlet of the bores 60. A cone-shaped member 74 includes a solid centrally located apex area 76. Dividers or fins 78 uniformly spaced on the cone extend downwardly and outwardly from the apex area 76 to define channels from the area 76 to the inlets of the individual bores 60 at the base of the cone-shaped member.

A lipped cover 80 fabricated from clear plastic for convenient distributor inspection snap fits over the distributor 50 and locks the distributor onto the upper end 28 of the support frame 24 independently of separate fasteners. The cover 80 has an upwardly converging central section 82 in the shape of a truncated cone. Near the base of the cone, a lipped flange 84 (FIGS. 4 and 5) extends around the periphery of the section 82 and is adapted for mating against the distributor flange 64. An O-ring 86 (FIG. 5) is supported within a groove in the flange 84. A cylindrical inner lip or downward projection 88 with a taper extends from the O-ring area for receipt by the cylindrical portion 72 of the distributor 50. A protective lip 90 depends from the front portion of the flange 84. A second, shorter lip 92 projects downwardly from the rear portion of the flange 84. Resilient snap members 102 depend from the flange 84 on opposite sides of the central section 82 and mate with the side tabs 52 on the distributor 50 to provide a releasible snap fit between the cover 80 and the distributor 50 and to secure the distributor to the end 28. The O-ring 86 seals the area between the distributor flange 64 and the cover 80 and assures a secure snap fit between the components. The tabs 52 and the snap members 102 include complimentary ramped surfaces 106 and 108 to urge the members 102 outwardly as the cover 80 is pushed downwardly over the distributor 50. A catch portion 110 on each member 102 springs under the corresponding tab 52 when the cover is in position on the distributor 50. The cover 80 can be easily released by urging the snap member 102 outwardly so the portion 110 clears the tab 52. Once the cover 80 is removed, the distributor can be released from the end 28.

The upper end of the cover 80 includes an integral nozzle support area 120 with an upper cylindrical portion 122 and a downwardly diverging lower portion 124 opening at 126 directly above the solid apex area 76. A flush line inlet 130 is located in the side of the cylindrical portion 122 and is connected to a flush line tube 131 (FIG. 2). Opposed cammed ramps 132 (FIGS. 4 and 5) project outwardly on opposite sides of the portion 122 and define part of a bayonet-type mounting arrangement for a nozzle described in detail below.

A nozzle assembly 140 is releasibly secured by the support area 120 and includes a conventional nozzle 144 having a lower orifice area 145 providing a cone-shaped spray pattern. The nozzle 144 is screwed onto a lower threaded portion 146 of a plastic easy release support member 148 having a finger grip area 150 and depending ramp engaging members 152 adapted to engage the cammed ramps 132. By simply rotating the assembly 140 a fraction of a turn with his fingers, the operator can attach and remove the assembly with the nozzle 144 relative to the cover 80. A nozzle inlet 156 projects upwardly and is connected to a tube 160 (FIG. 2) for supplying pad moistening fluid under pressure to the nozzle 144. The nozzle 144 sprays the fluid onto the cone shaped member 74 which divides the flow evenly to the bores 60. The support member 148 includes an upper flange 162, and an O-ring 166 seals the area between the member 148 and the top of the cylindrical portion 122 on the cover 80. The O-ring 166 also provides bias for a secure fit between the ramp 132 and ramp engaging members 152 when the assembly is rotated into an indexed locking position wherein the members 152 are stopped against downturned ends of the ramps 132 and are located in relief areas of the ramp.

To flush the distributor system, a volume of fluid is periodically supplied to the inlet 130 and around the nozzle 144. The flushing fluid moves downwardly in generally a uniform pattern through the opening 126 and around the end of the nozzle 144. The cone-shaped member 74 with the solid apex 76 assures uniform distribution of the flushing fluid to all the bores 60 and the corresponding tubes 44 and pads 32.

A protective shield 170 (FIG. 1) includes a top portion 172 held in position by the lip 90 of the cover 80. The shield 170 extends downwardly from the lip 90 to generally close the outwardly open area of the upper end 28 of the column frame 24. The cover 170 extends inwardly at a bend location 176 and terminates in a lower relatively flat area 178. A frame cover 180, which is bolted to the open side of the column frame 24, includes an upper end 182. The area 178 of the shield 170 is maintained in position between the end 182 and the frame 24. To remove the shield 170, the operator simply removes the cover 80 to release the top portion 172 from the lip 90 and lifts the shield from the frame cover 180. The shield 170 and cover 80 define a generally continuous smooth, dirt-shedding structure to prevent accumulation of foreign matter near the distributor 50. The lips 90 and 92 on the cover help keep away dirt and prevent any dirt from entering the distributor 50 as the cover 90 is being removed.

Having described the preferred embodiment, it will become apparent that various modifications can be made without departing from the scope of the invention as defined in the accompanying claims.

We claim:

1. In a cotton harvester having an upright spindle moistener column with an upper end and a plurality of spindle cleaning pads, a fluid distribution system for supplying fluid to the pads, the distribution system comprising:
   a distributor supported adjacent the upper end of the column and including a plurality of fluid outlets connected to the cleaning pads;
   a distributor cover removably connected to the distributor;
   a nozzle supported by the cover above the distributor for supplying a flow of fluid to the fluid outlets; and
   a flush line providing an additional flow of fluid to the distributor, wherein the flush line is connected to the distributor cover.

2. The invention as set forth in claim 1 wherein the distributor includes a cone-shaped portion having a solid apex generally aligned with the nozzle and extending downwardly from the apex to the fluid outlets to thereby provide a substantially uniform flow of fluid from the nozzle and flush lines to the cleaning pads.

3. The invention as set forth in claim 1 wherein the distributor cover is fabricated from a clear plastic for visual inspection of fluid flow within the cover.

4. The invention as set forth in claim 1 wherein the distributor cover includes an inlet, and the flush line is connected the inlet above the distributor.

5. The invention as set forth in claim 4 wherein the nozzle is supported from the distributor cover adjacent the inlet.

6. The invention as set forth in claim 5 wherein the cover includes a downwardly diverging nozzle support structure defining a fluid opening around the nozzle and providing generally uniform flush fluid flow to the fluid outlets.

7. The invention as set forth in claim 1 including snap fit structure securing the cover to the distributor independently of any separate fasteners.

8. The invention as set forth in claim 7 including an o-ring providing a seal between the cover and the distributor and facilitating snap fit securing of the cover to the distributor.

9. The invention as set forth in claim 1 wherein the nozzle is releasibly secured in the distributor cover independently of additional fasteners.

10. Then invention as set forth in claim 9 including a bayonet mount securing the nozzle to an upper apex area of the nozzle cover.

11. The invention as set forth in claim 1 including protective structure overlapping the distributor and preventing dirt from falling from the cover into the distributor.

12. The invention as set forth in claim 11 wherein the protective structure includes a removable dirt shield releasibly connected to the column and having an upper end supported between the distributor and the structure overlapping the distributor.

13. In a cotton harvester having an upright spindle moistener column with an upper end and a plurality of spindle cleaning pads, a fluid distribution system for supplying fluid to the pads, the distribution system comprising:
   a distributor supported adjacent the upper end of the column and including a plurality of fluid outlets in fluid communication with the cleaning pads;
   a distributor cover removably connected to the distributor;
   a nozzle supported above the distributor for supplying a flow of fluid to the fluid outlets;
   wherein the distributor includes a cone-shaped surface having a solid apex located directly below the nozzle, the outlet located radially outwardly of and below the apex; and
   a flush line opening above the solid apex for directing an additional flow of fluid downwardly onto the cone-shaped surface.

14. The invention as set forth in claim 13 wherein the distributor cover includes a nozzle-receiving area located above the solid apex and a nozzle seal, the nozzle-receiving area supporting the nozzle in generally sealed relationship with respect to the cover.

15. In a cotton harvester having an upright spindle moistener column with an upper end and a plurality of spindle cleaning pads, a fluid distribution system for supplying fluid to the pads, the distribution system comprising:
   a distributor supported adjacent the upper end of the column and including a plurality of fluid outlets in fluid communication with the cleaning pads;
   a nozzle supported above the distributor for supplying a flow of fluid to the fluid outlets;
   wherein the distributor includes a cone-shaped surface having a solid apex located directly below the nozzle, the outlets located radially outwardly of and below the apex;
   wherein the cover includes a flush line located adjacent the nozzle-receiving area above the apex for providing a flow of flushing fluid.

16. The invention as set forth in claim 13 including a shield supported adjacent the distributor, wherein the shield, distributor and cover define a generally continuous and smooth dirt-shedding surface to prevent build-up of material in an area adjacent the distributor.

17. The invention as set forth in claim 16 wherein the shield is supported between the cover and the column independently of separate fasteners.

18. The invention as set forth in claim 13 wherein the cover is generally cone-shaped and has a base end opening downwardly onto the distributor, the cover fabricated from a clear material to facilitate visual inspection of fluid distribution.

19. The invention as set forth in claim 13 including an o-ring supported between the cover and the distributor and providing a seal therebetween.

20. The invention as set forth in claim 18 wherein the cover has an upper nozzle-receiving end with integral nozzle retaining structure facilitating mounting of the nozzle independently of separate fasteners and without need of tools.

21. In a cotton harvester having an upright spindle moistener column with a channel-shaped frame and a plurality of spindle cleaning pads supported from the frame, a fluid distribution system for supplying fluid to the pads, the distribution system comprising:
   a distributor supported in an upper end of the frame and including a plurality of fluid outlets in fluid communication with the cleaning pads; and
   a distributor cover removably connected to the distributor, the cover including locking structure securing the distributor to the frame, independently of separate fasteners, when the cover is connected to the distributor, the cover supporting first and second fluid lines for providing a cleaning flow of fluid and an additional flushing flow of fluid to the distributor.

22. The invention as set forth in 21 including:
   nozzle structure connected to the first fluid line and releasibly supported within the cover above the distributor for supplying a flow of fluid around the nozzle structure to the fluid outlets.

23. In a cotton harvester having an upright spindle moistener column with a channel-shaped frame and a plurality of spindle cleaning pads supported from the frame, a fluid distribution system for supplying fluid to the pads, the distribution system comprises:

a distributor supported in an upper end of the frame, independently of separate fasteners, and including a plurality of fluid outlets in fluid communication with the cleaning pads;

a distributor cover removably connected to the distributor, the cover including locking structure securing the distributor to the frame, independently of separate fasteners, when the cover is connected to the distributor;

nozzle structure releasibly supported within the cover above the distributor for supplying a flow of fluid to the fluid; and including a flushing fluid inlet integral with the cover and offset above the distributor.

* * * * *

UNITED STATES PATENT AND TRADEMARK OFFICE
CERTIFICATE OF CORRECTION

PATENT NO. : 5,722,224
DATED : 3 March 1998
INVENTOR(S) : Donald Henry Sheldon, Jr. et al.

It is certified that error appears in the above-indentified patent and that said Letters Patent is hereby corrected as shown below:

Column 6, claim 15, line 20, insert - - a distributor cover removably connected to the distributor; - -

Column 6, claim 15, line 26, insert - - wherein the distributor cover includes a nozzle-receiving area located above solid apex and a nozzle seal, the nozzle-receiving area supporting the nozzle in generally sealed relationship with respect to the cover; and - -

Column 6, claim 15, line 27 insert - - inlet - - after line and before located.

Column 7, claim 23, line 7, delete - - comprises: - - and insert - - comprising: - -

Signed and Sealed this

Twenty-first Day of July, 1998

Attest:

BRUCE LEHMAN

Attesting Officer

Commissioner of Patents and Trademarks